Patented May 22, 1934

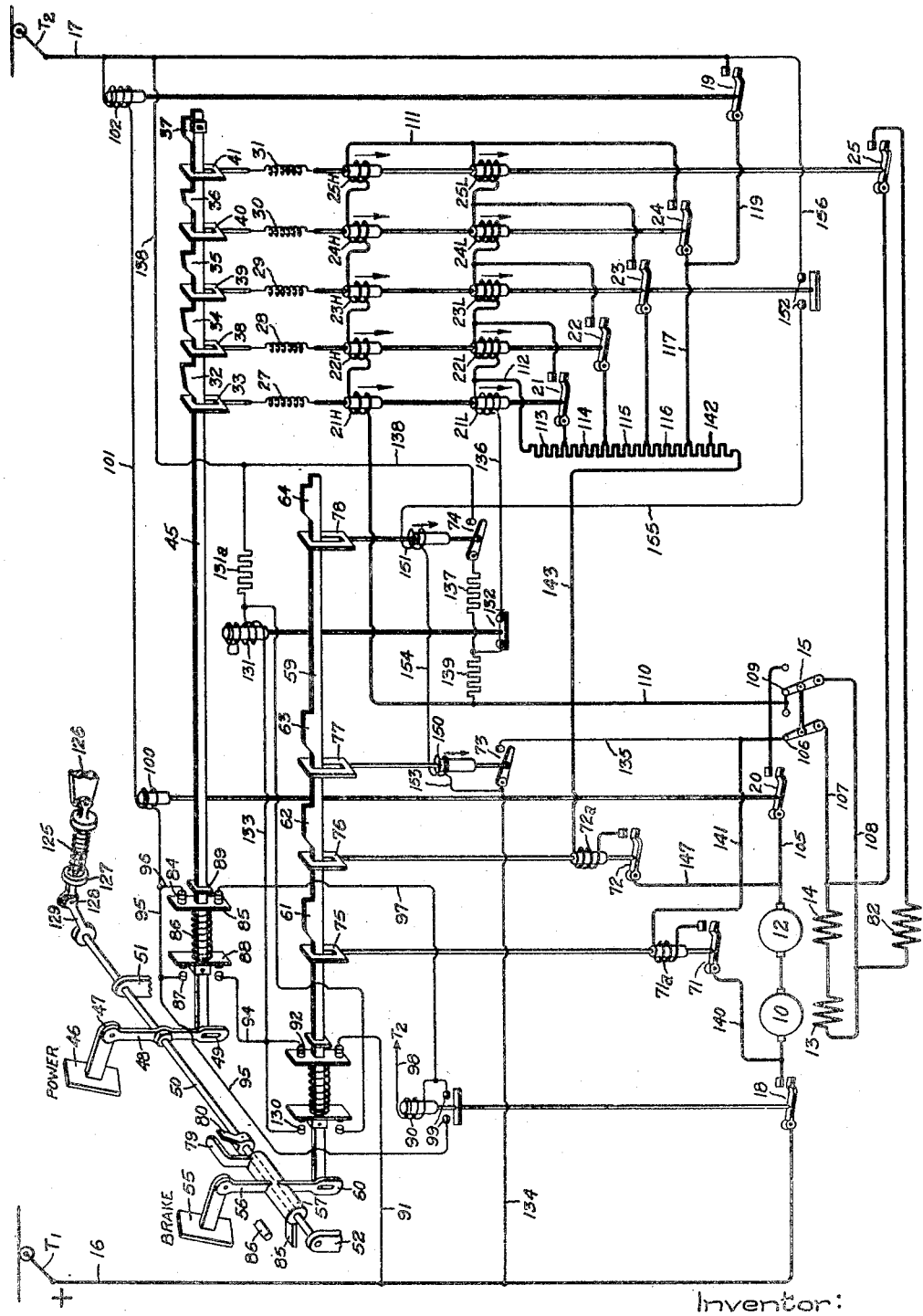

1,960,060

UNITED STATES PATENT OFFICE 1,960,060

CONTROL SYSTEM

Jacob W. McNairy, Erie, Pa., assignor to General Electric Company, a corporation of New York Application April 22, 1932, Serial No. 606,894

19 Claims. (Cl. 172—179)

My invention relates to motor control systems of the type used on traction drives, more particularly to such systems wherein the accelerating and braking efforts of the driving motors may be manually varied between predetermined limits and has for an object the provision of a simple, flexible and reliable control system of this character.

While it has broad application to control systems in general, my invention is particularly suitable for electric busses of the trackless type wherein the electric driving motors are arranged to receive power from a pair of supply conductors.

Heretofore, in certain types of trolley busses the rates of acceleration and retardation of the driving motors have been entirely under the control of an operator. In such systems much abuse of the motors and the control equipment has been possible due to the carelessness of the operator in effecting a too rapid acceleration or deceleration of the bus. Furthermore, in passenger vehicles the excessive rates of acceleration and braking result in considerable discomfort to the passengers and deterioration of the vehicle itself.

In systems which automatically control the rates of acceleration and braking in accordance with changes in motor current and the like, protection of the control equipment is provided, but the flexibility of the system is reduced. Consequently, such a bus may not be capable of satisfactory operation in heavy traffic. A control system which will meet these several demands must be arranged so that the operator may quickly bring the vehicle to a standstill, or so that he may accelerate it at a rapid rate, depending on the particular traffic conditions which are encountered.

It is a further object of my invention to provide a control system suitable for abnormal traffic conditions and which affords protection to the motors and reduces to a minimum the abuse of the equipment.

In carrying out my invention in one form thereof, I provide a plurality of circuit controlling elements, the operation of each one of said elements depending upon the relation between a manually controlled biasing force and an opposing biasing force varying with a condition of the circuit. More specifically, I provide a plurality of sequentially operable contactors arranged to control the resistance of the armature circuit of the driving motor. An electrical biasing force, the magnitude of which varies with the motor current, is applied to each contactor in a direction to open it, while a mechanical biasing force, the magnitude of which is proportional to the pressure on an operating lever, is applied in a direction to close the switch. The rapidity with which these switches close will be determined by the magnitude of the mechanical biasing force, with respect to the magnitude of the opposing biasing force derived from the magnitude of the motor current. Consequently, movement of the operating lever in a direction to increase the mechanical biasing forces causes the contactors to close for correspondingly higher values of motor current.

The principle of my invention having once been explained, it will be obvious to those skilled in the art that the accelerating resistance and the contactors may be utilized either for the control of the acceleration or the retardation of the bus, and while it is contemplated that the acceleration or the braking control may be used independently I prefer at the present time to use the same resistance and the same accelerating contactors both during acceleration and deceleration of the bus.

For a more complete understanding of my invention, reference should now be had to the drawing in which I have diagrammatically shown my invention as applied to a trolley operated bus.

Referring to the drawing, I have shown my invention in one form as applied to the control of the driving motors 10 and 12. These motors are of the series type and are respectively provided with series field windings 13 and 14 arranged to be connected in series with the motor armatures through a reversing switch 15.

The power supply for these motors is obtained from the supply lines 16 and 17 respectively connected to the trolleys T1 and T2. For power operation the line contactors 18 and 19 are closed as well as the contactor 20 which connects the armatures of the motors 10 and 12 through the reversing switch 15 to the field windings 13 and 14. The rate of acceleration of the motors is controlled by means of the circuit controlling elements or contactors 21, 22, 23, 24 and 25. The contactors are respectively provided with locking coils 21L to 25L, inclusive, and with holding coils 21H to 25H, inclusive. Each locking coil is provided with a large number of turns with respect to the number of turns on the holding coil so that a relatively small current flowing through the locking coils will be sufficient to produce a force of such magnitude that the respective switches are locked in the open position. A mechanical biasing force is applied to each switch in a direction to close the switch by means of the tension springs 27, 28, 29, 30 and 31. For example, the mechanical biasing force is applied to the contactor 21 by means of a cam 32 arranged so that an operating member 33 may be moved upwardly, thereby applying a mechanical biasing force through the spring 27 to the contactor 21. The magnitude of the biasing force depends upon the amount of travel of the cam 32 with respect to the operating member 33. A mechanical biasing force is similarly applied to the contactors 22—25, inclusive, by means of the cams 34, 35, 36 and 37 arranged in cooperating relation with the operating members 38, 39, 40 and 41. The cams are rigidly secured to an operating bar 45 mounted in suitable supports (not shown) for endwise movement and it will be seen that the magnitude of the biasing forces applied to the respective switches will depend on the extent of the movement of the operating bar 45.

As shown, the operating bar 45 is actuated by means of a power pedal 46 pivotally secured at 47 to one end of a lever 48, the other end of the lever 48 being pivotally connected at 49 to the operating bar 45. The lever 48 is rigidly secured at its mid-position to a shaft 50 mounted in suitable supports 51 and 52. Whenever the pedal 46 is depressed rotation is imparted to the shaft 50 in a clockwise direction thereby moving the bar 45 in a direction to apply the mechanical biasing forces to the contactors 21—25, inclusive.

A brake pedal 55 is similarly secured to a lever 56, which lever is secured to a sleeve 57 rotatably carried on the shaft 50. An operating bar 59, to which is secured the cams 61, 62, 63 and 64 is pivotally secured at 60 to one end of the lever 56. The contactors 71 and 72 in conjunction with the switches 73 and 74 are arranged to be closed by means of their respective cams 61, 62, 63 and 64 upon a predetermined movement of the brake pedal 55. As shown the extent of movement necessary to bring the cams 61—64, inclusive, into engagement with their respective operating members 75, 76, 77 and 78 is indicated by the distance between an arm 79 arranged to be rotated with the sleeve 57 and a member 80 secured to the shaft 50. When braking is desired the brake pedal is depressed thereby closing the contactors 71 and 72 and the switches 73 and 74, which contactors and switches establish the dynamic braking circuit. Further movement of the brake pedal 55 rotates the shaft 50 in a clockwise direction, by means of the lever 79 and the member 80, thereby moving the operating bar 45 in a direction to bring the respective cams 32—36, inclusive, into engagement with their respective operating members so that the mechanical biasing forces are again applied to the accelerating contactors 21—24, inclusive.

The contactor 25 is not operated during braking inasmuch as its function is to connect an inductive shunt 82 across the series field windings 13 and 14 for the last step in the acceleration of the motors to their full speed. The application of the mechanical biasing force to the contactor 25 is prevented by means of a mechanical stop on the sleeve 57. This stop is shown as an arm 85 secured to the sleeve 57 so as to engage a pin 86 rigidly secured to the frame (not shown), thereby preventing more than a predetermined movement of the brake pedal 55.

It is to be understood that the cams may be mounted on shafts arranged to be rotated by the brake and power pedals. For example, the cams 61, 63 and 64 could be secured to the sleeve 57 while the cams 32, 34, 35, 36 and 37 could be secured to the shaft 50. The operating members, springs, contactors and switches would accordingly be mounted in juxtaposition to the shafts and sleeve so as to form a part of a compact control assembly.

Preferably, two sets of interlock contacts are provided on each of the bars 45 and 59. Referring to the bar 45 it will be observed that the contacts 84 are normally closed by means of a bridging member 85 biased against the stationary contacts 84 by means of a compression spring 86. A pair of normally open contacts 87 are arranged to be closed by means of a bridging member 88 secured to the bar 45. If the power pedal 46 is depressed at a normal rate the contacts 87 are closed at once, the contacts 84 remaining closed until the power pedal has been depressed a predetermined amount. The contacts 84 are finally opened by reason of a member 89 secured to the lever 45 engaging the bridging member 85. This arrangement prevents an operator from quickly depressing the power pedal without permitting a sufficient interval of time for the line contactor 18 to close.

With the above understanding of the elements described and their organization with respect to each other in the system, the operation of the system itself and the manner in which the opposing mechanical and electrical biasing forces permit normal variation of the rates of acceleration and deceleration of the motors 10 and 12, will be readily understood from the description which follows.

In the operation of my invention in the form shown, it will be assumed that the trolleys T1 and T2 are connected to a suitable source of direct current supply so that the supply lines 16 and 17 are energized with the polarity indicated. It will also be assumed that the reversing switch 15 is in the correct position, as shown, for the forward movement of the vehicle. In order to initiate acceleration of the vehicle it is only necessary for the operator to depress the power pedal. Inasmuch as the rate of acceleration will depend upon the degree of pressure which is applied to the power pedal 46, it is expected that pressure will be applied gradually to the power pedal so that initially the lever 45 is moved at a normal rate. A normal rate of movement assures sufficient time for the line contactor 18 to be operated to its closed position. For example, the normally open contacts 87 are closed by the bridging member 88 upon initial movement of the operating bar 45 so that an energizing circuit may be traced for the operating coil 90 of the line contactor 18 from the supply line 16 by conductor 91, interlock contacts 92, conductor 94, contacts 87, conductors 95 and 96, contacts 84, bridging member 85, conductor 97, operating coil 90 and by conductor 98 to the other supply line 17 and trolley T2, which connection is indicated by the symbol T2. The line contactor 18 is immediately operated to its closed position and by means of the contacts 99 completes a holding circuit for the operating coil 90. This circuit may be traced from supply line 16 by conductor 91, interlock contacts 92, conductor 94, contacts 87, conductor 95, contacts 99, operating coil 90 of the contactor 18, and by the conductor 98 to the other supply line as indicated.

If the operator should jam the power pedal 46 downward quickly against the floor board or to its lower limit of travel, however, the member 89 is likewise moved quickly into engagement with the bridging member 85 so that the contacts 84 are opened before the line contactor 18 has closed to complete its holding circuit. Consequently, the line contactor is not operated to its closed position and power can not be supplied to the motors 10 and 12.

Continuing with the operation, as soon as the contacts 87 are closed, it will be observed that an energizing circuit is completed for the contactors 19 and 20. This circuit may be traced from the supply line 16 by conductor 91, interlock contacts 92, conductor 94, contacts 87, conductor 95, operating coil 100 of the contactor 20, conductor 101, operating coil 102 of the contactor 19 and to the other supply line 17. The power circuit for the motors 10 and 12 may now be traced from the supply line 16, line contactor 18, armatures of the motors 10 and 12, conductor 105, contactor 20, contact 106 of the reversing switch 15, conductor 107, field windings 14 and 13 of the motors, conductor 108, contact 109 of the reversing switch 15, conductor 110 through the respective holding coils 21H—25H, inclusive, conductor 111 and through the locking coils 25L, 24L, 23L and 22L, conductor 112, resistor sections 113, 114, 115, 116, conductors 117 and 119 and by the line contactor 19 to the other supply line 17.

It will be observed that the series locking coil 21L of the accelerating contactor 21 was not included in the motor circuit just traced. Consequently, as the power lever 46 is depressed, the resulting mechanical bias produced by the cam 32, the member 33 and the spring 27, needs only to be increased in magnitude until it overcomes the counterbiasing force electrically produced by the holding coil 21H. The result of the mechanical biasing force overcoming the electrical biasing force is the immediate closing of the contactor 21. This contactor not only short circuits the resistance 113 from the motor circuit, but it also short circuits the locking coil 22L of the accelerating contactor 22. It will therefore be seen that as soon as the accelerating contactor 21 closes, the mechanical biasing force produced on the contactor 22 is in opposition only to the electrical biasing force produced by the holding coil 22H. By providing the locking coils the sequential operation of the contactors is assured.

Should traffic conditions require an abnormally high rate of acceleration, it may be obtained, after the line contactor 18 is closed, by quickly moving the power pedal 46 through its entire limit of travel. The result will be the application of the maximum mechanical biasing force on each of the respective accelerating contactors so that these contactors will be successively closed as the motor speed increases. The motors 10 and 12, therefore, function to accelerate the bus or vehicle at its maximum rate. Inasmuch as the operation of the accelerating contactors 21 to 25, inclusive, depends upon the relative magnitudes of the opposing electrical and mechanical biasing forces, it will be understood that as long as the motor current is quite high the contactors will be held in their open positions. As the speed of the motor increases, causing the motor current to decrease, the electrical biasing force is diminished sufficiently so that the mechanical biasing force will operate the first accelerating contactor to its closed position. It will, therefore, be seen that the operator may control the rate of acceleration through wide limits while the contactors automatically provide protection for the motors against excessive current flow.

In order to minimize the physical effort required of the operator during normal conditions of acceleration or deceleration, a compression spring 125 is mounted between a stationary support 126 and a movable support 127 which is pivoted at 128 to a crank arm 129, secured to the shaft 50. In the position shown in the drawing the compression spring 125 is arranged to exert a biasing force against the crank arm 129 in a direction to prevent the movement of the power pedal 46. As soon as the power pedal has been depressed a slight amount, however, the crank 129 will be rotated in a clockwise direction so that the bias exerted by the compression spring 125 will be applied in a direction to aid the clockwise movement of the power pedal 46. The tension produced by the springs 27—31, inclusive, produces a component of force on the bar 45 of sufficient magnitude to return the spring 125 to its original position whenever the pressure is entirely removed from the bar 45.

Inasmuch as the rate of acceleration is determined as a function of the movement of the power pedal 46, it will be clear that if the pressure applied to this pedal is reduced the mechanical biasing forces will cause the power pedal to be returned towards its original position. The result is a reduction in the mechanical biasing force applied to each contactor and the electrical biasing force applied to the respective contactors may then be effective to cause the contactors to be opened in the reverse order. The result, of course, will be a decrease in the rate of acceleration. This sequential operation of the contactors, either in the forward or reverse order, is an important feature of my invention inasmuch as it contributes materially to the ease with which an operator may control the acceleration of the bus for quickly changing traffic conditions.

Whenever dynamic braking is desired it is only necessary to release the power pedal 46 and to apply pressure to the brake pedal 55. As soon as the power pedal is released the accelerating contactors 21—24, inclusive, are immediately operated to their open positions, while the contacts 87 are opened to interrupt the energizing circuit of the contactors 19 and 20 and to interrupt the holding circuit of the line contactor 18. Consequent to the initial movement of the brake pedal 55, a pair of normally open contacts 130 are closed to short circuit the operating coil 131 of a time opening relay 132 and to open the normally closed contacts 92, which contacts serve to prevent the closing of the contactors 18, 19 and 20 if the power pedal should be depressed while the brake pedal is in use. The energizing circuit for the operating coil 131 of the time relay 132 may be traced from the supply line 16 by conductor 91, contacts 92, conductors 94 and 133, operating coil 131, resistance 131a and by conductor 138 to the other supply line 17.

The contactors 71 and 72 and the switches 73 and 74 are simultaneously closed as soon as the brake pedal has been moved a short distance, thereby establishing the braking circuits for the motors. For the initial part of the braking operation, separate excitation is supplied to the field windings 13 and 14 through a circuit which may be traced from the supply line 16 by conductor 134, switch 73, conductor 135, contacts 106 of the reversing switch 15, conductor 107, field windings 14 and 13, conductor 108, contacts 109 of the reversing switch 15, conductor 110, holding coils 21H—25H, inclusive, conductor 111, locking coils 25L, 24L, 23L, 22L, 21L, conductor 136, time relay 132, resistor 137, switch 74 and by conductor 138 to the other supply line 17. It will be observed that current may also flow through the field circuit just traced from conductor 110, resistance 139, resistance 137, switch 74, and by conductor 138 to the other supply line 17. However, the resistance 139 is selected so that its resistance is much greater than the resistance of the holding coils and the locking coils provided on the accelerating contactors. Consequently, substantially all of the current flowing through the field windings takes the path through the holding coils and the locking coils of the contactors in preference to the path through the resistance 139. In this manner the contactors 21—25, inclusive, are positively locked in their open positions by the locking coils. Inasmuch as the value of the current required for the separate excitation of the motors is much less than the normal armature current which flows through the locking coils, the reason for providing the relatively large number of turns for the locking coils will now be apparent. The armature circuit for the braking of the motors may be traced from the left-hand side of motor 10 by conductor 140, contactor 71, holding coil 71a of the contactor, conductor 141, contacts 106 of the reversing switch 15, conductor 107, field windings 13 and 14, conductor 108, contacts 109 of the reversing switch 15, conductor 110, the holding coils 21H—25H, inclusive, conductor 111, locking coils 25L, 24L, 23L, 22L, conductor 112, resistors 113, 114, 115, 116, 142, conductor 143, holding coil 72a, contactor 72, conductor 147 and by conductor 105 to the other side of the armature of the motor 12.

The time opening relay 132 is designed to maintain its contacts closed a sufficient interval of time after its operating coil 131 has been short circuited to permit the motors 10 and 12 to build up sufficient voltage to cause enough current to flow through the holding coils and the locking coils of the contactors to cause the locking coils to function in the manner described for the motoring operation, thereby securing the sequential operation of the contactors. Consequent to the opening of the contacts of the time relay 132 the separate excitation circuit through the holding and the locking coils of the contactors is interrupted, causing a reduction in the excitation current supplied from the separate source of supply. The locking coil 21L of the contactor 21 is deenergized by the opening of the time relay 132 and as soon as the mechanical biasing force produced by the tension spring 27 has been increased to overcome the electrical biasing force produced by the holding coil 21H, the contactor 21 will, of course, be closed.

The magnitude of the mechanical biasing force applied to each of the contactors depends upon the position of the brake pedal 55. For example, as the brake pedal is depressed, the lever 79 secured to the sleeve 57 strikes the member 80 thereby rotating the shaft 50 so that the operating bar 45 again serves to increase the mechanical biasing force applied to the respective contactors in the same manner as described for the acceleration of the motors. The field shunting contactor 25 may not be closed during braking inasmuch as the maximum field excitation is desired after the contactor 24 is closed. The closing of the contactor 25 is prevented by the member 85 secured to the sleeve 57 striking the pin 86 before the cam 37 engages the operating member 41.

Continuing with the operation of my invention, as soon as the accelerating contactor 21 has closed to short circuit the resistance 113, and the locking coil 22L of the contactor 22, the accelerating contactor 22 may be closed by the exertion of a mechanical biasing force of greater magnitude than the electrical biasing force produced by the holding coil 22H.

The separate source of excitation is disconnected as soon as the accelerating contactor 23L closes. This will be seen by observing that the switches 73 and 74 are respectively provided with the coils 150 and 151 which are arranged to be energized by the closing of the contacts 152 operated with the accelerating contactor 23. The operating members 77 and 78 are designed so that the cams 63 and 64 are effective for the closing of the switches 73 and 74 while the coils 151 and 153 are effective for the opening of these switches. This energizing circuit completed by the closing of the contacts 152 may be traced from the supply line 16 by conductors 134 and 153, operating coil 150, conductor 154, operating coil 151 of the switch 74, conductor 155, contacts 152 of the contactor 23 and by conductor 156 to the other supply line 17. The contactors 73 and 74 are thereupon operated to open their respective contacts thereby interrupting the circuit for the separate source of field excitation.

If it were not for the provision of the separate source of excitation for the field windings 13 and 14, during the initial accelerating steps, a considerable time delay might arise due to the time lag of the magnetic circuits of the motors. This field flashing or field forcing feature of my invention combined with the locking coils decreases the time required to decelerate the vehicle besides insuring the gradual application of the braking effort. The rate of deceleration is, of course, directly controlled by the extent of the movement of the brake pedal 55 and the resulting biasing force with respect to the magnitude of the current flowing through the holding coils.

As in the case of acceleration, decreasing the pressure on the brake pedal 55 causes the contactors to be opened in their reverse order thereby decreasing the rate of deceleration. It will now be clear that the flexibility of the control of the rates of acceleration and deceleration achieved by my invention permits the rapid acceleration of the bus to full speed, a controlled rate of deceleration, and a return of acceleration, simply by the selective operation of the brake and power pedals.

While I have shown a particular embodiment of my invention, it will be understood of course that I do not wish to be limited thereto since many modifications may be made, and I therefore contemplate by the appended claims to cover any such modifications as fall within the spirit and scope of my invention.

What I claim as new and desire to secure by Letters Patent of the United States, is:

1. A motor control system for traction drives comprising a motor, a plurality of contactors for varying the energization of said motor, means responsive to an electrical condition of said motor for producing a biasing force on each of said contactors, means for applying to each of said contactors an opposing biasing force, and manually operated means for simultaneously varying the magnitude of said opposing biasing forces.

2. A motor control system for traction drives comprising a motor, a plurality of contactors connected to control the energization of said motor, each of said contactors having opposing mechanical and electrical biasing means, an operating lever for varying substantially simultaneously and progressively within predetermined limits the magnitude of the force produced by said mechanical biasing means on each of said contactors, and means responsive to an electrical condition of said motor for varying the magnitude of the force produced by said electrical biasing means.

3. A motor control system for traction drives comprising a motor, a plurality of contactors connected to control the energization of said motor, each of said contactors having opposing mechanical and electrical biasing means, an operating lever for progressively varying the magnitude of the bias produced by said mechanical biasing means on each successive contactor within predetermined limits, and means responsive to an electrical condition of said motor for varying the magnitude of the bias produced by said electrical biasing means and means for insuring the sequential operation of said switches.

4. The method of controlling the operation of a plurality of contactors connected in an electrical circuit which consists in electrically applying to each of said contactors an electrical biasing force, varying the magnitude of said biasing force in accordance with the current in said circuit, applying an opposing biasing force to each of said contactors in succession, and varying the magnitude of said opposing biasing force in a manner to cause the contactors to be opened or closed for different values of current.

5. The method of controlling the opening and closing of a plurality of contactors connected in an electrical circuit which consists in electrically producing a biasing force on each of said contactors, varying said force in accordance with a condition of said circuit, applying an opposing biasing force to each of said contactors and progressively varying the magnitude of said opposing biasing force so as to vary the operation of said contactors.

6. The method of controlling the acceleration and deceleration of vehicles provided with a driving motor and sequentially operable contactors for controlling the energization thereof, which consists in electrically applying a force to each of said contactors in a direction to open said contactors, varying the magnitude of said force in accordance with the motor current, manually applying a biasing force in a direction to close said contactors, and progressively varying said manual biasing force so that said contactors are closed for different values of motor current.

7. The method of controlling the acceleration and deceleration of vehicles provided with a driving motor and sequentially operative switches for controlling the energization thereof which consists in electrically biasing each of said switches to its open position, manually applying a biasing force to said switches in a direction to close said switches, and varying the magnitude of said mechanical biasing force so as to control the rates of acceleration and deceleration of the vehicle.

8. In combination with an electrical circuit, a plurality of control elements, each element having opposing biasing means for effecting operation of the elements in accordance with the unbalance therebetween, adjustable means for varying substantially simultaneously and progressively one of the biasing means of each element, automatic means responsive to a predetermined condition of the circuit for varying the other biasing means of each element, and means for controlling the unbalance between the said opposing variable biasing means to effect operation of the elements in predetermined sequence.

9. In an electrical circuit controlling device, a plurality of movable switch elements, each element having a mechanical biasing means and an opposing electrical biasing means for operating the switch elements between two positions in accordance with the unbalance between the mechanical and electrical biasing forces, an adjusting means for varying substantially simultaneously and progressively the mechanical biasing forces of the elements between maximum and minimum values, connections for energizing the electrical biasing means of said switch elements in accordance with a variable electrical condition, additional electrical biasing means for each switch element and connections controlled by the switch elements for varying the energization of said additional electrical biasing means to effect operation of the switch elements in a predetermined sequence.

10. An electrical circuit controlling device comprising a plurality of contactors, each separately operable to regulate the value of an electrical characteristic of the circuit, and each having opposing mechanical biasing means and electrical biasing means for effecting operation of the contactors in accordance with the unbalance between the mechanical and electrical biasing forces, connections for energizing the electrical biasing means of said contactors in accordance with said electrical characteristic of the circuit, a member adjustable to any selected position between predetermined limits for varying substantially simultaneously and progressively the mechanical biasing forces of said elements, and means for controlling the unbalancing of the mechanical and electrical biasing forces to effect operation of the elements in a predetermined sequence.

11. In a circuit controlling device, a series of circuit controlling elements, each separately operable to regulate the value of the current in the circuit, means for biasing the elements for operation including a member adjustable to each of a plurality of positions for varying the bias between maximum and minimum limits, electrical means responsive to the current in the circuit for opposing said biasing means to restrain said operation of said elements, and automatic electrical means associated with each element for assisting said biasing means said automatic means being rendered inoperative by operation of each preceding element, whereby sequential operation of said elements is insured.

12. In a circuit controlling device, a series of separately operable switches, a member adjustable to any selected one of a plurality of positions and having a separate resilient connection with each switch for exerting a variable biasing force thereon dependent upon the position of said member, a separate electromagnet associated with each switch for electrically producing a force thereon opposing said variable biasing force, holding coils for said electromagnets connected in series in the circuit, and a locking coil on the electromagnet of each switch in the series, connected to be controlled by the operation of the preceding switch.

13. The combination with an electrically operated vehicle, of a driving motor therefor, a plurality of contactors for controlling the energization of said motor, each of said contactors being provided with a biasing coil responsive to the current flowing to said motor, a pedal movable between predetermined positions, and biasing means operable by movement of said pedal for producing simultaneously a biasing force on each of said contactors in a direction opposing the bias produced by said coil, the magnitude of said force varying between predetermined limits in accordance with the position of said pedal.

14. The combination with an electrically operated vehicle, of a driving motor therefor, a power lever and a brake lever for respectively controlling the energization of said motor for power and braking operations, a resistance connected in circuit with said motor, a plurality of contactors for varying the value of said resistance, each of said contactors having opposing mechanical and electrical biasing means, connecting means between each of said mechanical biasing means and one of said levers, and means for interlocking said levers with each other so that said levers may be selectively operated to vary the magnitude of said mechanical biasing means and thereby control the operation of said motor.

15. In combination, a series wound motor for traction drives, a resistance arranged to be connected in circuit with said motor for acceleration and braking operations, a plurality of contactors for progressively varying the value of said resistance, each of said contactors having opposing biasing means, means for varying one of said biasing means in accordance with the motor current, a power pedal, a braking pedal, and an operating lever connected to one of said pedals for varying the other of said biasing means, and means responsive to a predetermined movement of the other of said pedals for actuating said operating lever, and means responsive to initial movement of said power pedal for connecting said motor for accelerating and means responsive to the initial movement of said brake pedal for connecting said motor for braking.

16. A control system for a motor including a resistance, a plurality of contactors for varying said resistance, each of said contactors having a mechanical biasing means and an opposed electrical biasing means, an operating lever for varying the magnitude of the force of each of said mechanical biasing means, a field winding for said motor, means for connecting said motor armature, field winding and resistance in a closed series circuit for braking, means responsive to the establishment of said series circuit for supplying additional excitation current to said field winding, and timing means for decreasing the additional magnitude of the excitation current a predetermined time after the establishment of said braking circuit.

17. In an electric traction drive the combination of a motor having a series field winding, a resistance arranged to be connected in circuit therewith, a plurality of switches for varying the value of said resistance, each of said switches having opposed electrical and mechanical biasing means, a locking coil for each of said switches for biasing said switches to their open position, connections for connecting said electrical means in circuit with said motor, and means for separately exciting said series field winding through a circuit including said locking coils.

18. A control system for controlling the acceleration and dynamic braking of a series type traction motor, comprising a resistance, a plurality of contactors for varying the value of said resistance, each of said contactors having a coil spring for applying a mechanical biasing force thereto and a coil responsive to the motor current for producing a biasing force opposed to said mechanical biasing force, a power pedal and a braking pedal, means responsive to a predetermined movement of said power pedal for connecting said motor armature field winding, said coils and said resistance in series for acceleration, means responsive to further movement of said power pedal for tensioning said springs in a direction to increase said mechanical biasing force in a direction to close in succession said contactors, means responsive to a predetermined movement of said braking pedal for connecting said motor armature, said field winding, said coils and said resistance in a series dynamic braking circuit, means responsive to said predetermined movement of said braking pedal for applying separate excitation to said field winding, means responsive to further movement of said braking pedal for tensioning said springs in a direction to close said contactors and means responsive to the closing of one of said contactors for removing said separate excitation from said field winding, locking coils on each of said contactors responsive to the motor current for insuring the sequential operation of said contactors, the said excitation current energizing said locking coils during initial braking of said motor thereby preventing simultaneous operation of said contactors.

19. In combination, a series wound motor for electric vehicle drives and the like, a resistance arranged to be connected in circuit with said motor, a plurality of contactors for progressively varying the value of said resistance, a power lever and a braking lever, means responsive to a predetermined movement of said power lever for energizing said motor armature, its series field winding and said resistor in series circuit relation, and means responsive to further movement of said power lever for operating said switches in sequence, means responsive to a predetermined movement of said braking lever for connecting said motor armature and field winding in series with said resistor, and for applying separate excitation to said field winding, means responsive to further movement of said braking lever for operating said contactors in sequence, and means responsive to the operation of one of said switches for discontinuing the separate energization of said field winding.

JACOB W. McNAIRY.